United States Patent [19]

Satake et al.

[11] Patent Number: 5,281,879

[45] Date of Patent: * Jan. 25, 1994

[54] SYNCHRONOUS MOTOR WITH TWO PERMANENT MAGNET ROTOR PORTIONS

[75] Inventors: Toshihiko Satake, Higashihiroshima; Yukio Onogi, Hiroshima, both of Japan

[73] Assignee: Satake Corporation, Tokyo, Japan

[*] Notice: The portion of the term of this patent subsequent to Sep. 1, 2009 has been disclaimed.

[21] Appl. No.: 873,091

[22] Filed: Apr. 24, 1992

[30] Foreign Application Priority Data

Apr. 27, 1991 [JP] Japan ................... 1-25507

[51] Int. Cl.⁵ ..................... H02K 16/00; H02K 16/02
[52] U.S. Cl. ................... 310/114; 318/771; 310/212; 310/156
[58] Field of Search ............... 310/114, 125, 166, 263, 310/101, 112, 156, 68 R, 162, 163, 164, 49 R, 212; 318/771, 785, 786, 773, 77 J

[56] References Cited

U.S. PATENT DOCUMENTS

| | | | |
|---|---|---|---|
| 3,596,119 | 7/1971 | Goldman | 310/114 X |
| 4,556,809 | 12/1985 | Beisse et al. | 310/114 |
| 4,577,126 | 3/1986 | Mailfert | 310/114 X |
| 4,626,719 | 12/1986 | Foster | 310/114 X |
| 4,785,213 | 11/1988 | Satake | 310/114 X |
| 5,144,180 | 9/1992 | Satake et al. | 310/156 X |

Primary Examiner—Steven L. Stephan
Assistant Examiner—E. To
Attorney, Agent, or Firm—Fish & Richardson

[57] ABSTRACT

A synchronous motor includes a unitary rotor, a first stator, a second stator and phase-changing switches. The unitary rotor has a first rotor portion formed by a first permanent magnet and a second rotor portion formed by a second permanent magnet and an induction type rotor and these first and second rotor portions are mounted on a common rotary axle with a predetermined space provided therebetween. The first stator faces the first rotor portion for producing a first rotating magnetic field. The second stator faces the second rotor portion for producing a second rotating magnetic field and is disposed such that, at the starting operation, the attracting action or the repelling action produced between the first rotating magnetic field and the first permanent magnet is canceled by the repelling action or the attracting action produced between the second rotating magnetic field and the permanent magnetic field. The phase-changing switches are associated with either one of the first stator or the second stator and set a phase difference of 0 degree or 180 degrees between the first rotating magnetic field and the second rotating magnetic field. Due to the cancellation action, any starting interference which may otherwise be caused by the permanent magnets is made negligible.

7 Claims, 3 Drawing Sheets

SYNCHRONOUS MOTOR WITH TWO PERMANENT MAGNET ROTOR PORTIONS

BACKGROUND OF THE INVENTION (1) Field of the Invention

The present invention relates to an induction synchronous motor of a permanent magnet type which starts by the induction motor action and is brought into a synchronous operation by permanent magnets.

(2) Description of the Related Art

A conventional motor of the kind to which the present invention relates is a synchronous motor having a brushless configuration. In such a conventional motor, a unitary rotor comprises a squirrel cage type conductive portion of the induction motor and a rotor portion of permanent magnets. The motor starts by the magnetic induction action produced between the rotating magnetic field of the stator and the squirrel cage type conductive portion of the induction motor and, when the rotating speed accelerates from the asynchronous speed of the induction motor and approaches the synchronous speed, that is, when the slip approaches zero, the rotating magnetic field of the stator and the magnetic poles of the permanent magnets attract each other thereby changing the motor speed to its synchronous speed.

In the conventional synchronous motor explained above, the motor starts by the magnetic induction action between the rotating magnetic field of the stator and the squirrel cage type conductor portion of the induction motor. During the asynchronous operation under this state, there are produced at the same time an attracting action and a repelling action between the permanent magnets and the rotating magnetic field produced by the stator. This necessitates the squirrel cage type conductive portion to have a magnetic induction action fully sufficient to overcome the starting interference caused by the simultaneous attraction and repulsion between the permanent magnets and the rotating magnetic field of the stator during the asynchronous speed operation. Thus, the squirrel cage type conductive portion of the induction motor is required to be sufficiently large to overcome and to make negligible the starting interference of the permanent magnet rotor. On the other hand, the synchronous torque which is inherently required depends on the size of the permanent magnets. In order to enable the starting torque of the induction motor to be sufficiently large to overcome the action of the permanent magnets, it has been required that the permanent magnets be kept small. For this reason, in comparison of the size of the motor with its output, a brushless synchronous motor of a permanent magnet type has remained large in size.

The brushless induction motor of a permanent magnet type as explained above is often used in recording or reproduction devices of small sizes in which WOW is particularly undesired. The problems as explained above place limits to making such devices more compact so that there is a demand and desire for the realization of a synchronous motor which is small in size but its output remains large.

SUMMARY OF THE INVENTION

It is, therefore, an object of the invention to overcome the problems existing in the conventional synchronous motor and to provide an improved synchronous motor having two permanent magnet rotor portions, in which any starting interference caused by the permanent magnet rotor portions is made negligible due to the cancellation action.

According one aspect of the invention, there is provided a synchronous motor comprising:

a unitary rotor which has a first rotor portion formed by a first permanent magnet and a second rotor portion formed by a second permanent magnet and an induction type rotor, the first rotor portion and the second rotor portion being mounted on a common rotary axle with a predetermined space being provided therebetween;

a first stator which surroundingly faces the first rotor portion for producing a first rotating magnetic field around the first rotor portion;

a second stator which surroundingly faces the second rotor portion for producing a second rotating magnetic field around the second rotor portion, the second stator being disposed so that, at the starting operation, the attracting action or the repelling action produced between the first rotating magnetic field and the first permanent magnet is canceled by the repelling action or the attracting action produced between the second rotating magnetic field and the second permanent magnetic; and a phase-changing means which is associated with either one of the first and second stators and which sets a phase difference between the first rotating magnetic field produced by the first stator and the second rotating magnetic field produced by the second stator at a first phase difference for starting operation and at a second phase difference for synchronous operation, the second phase difference being different from the first phase difference by 180 degrees.

In a preferred arrangement, the positions of the first permanent magnet and the second permanent magnet on the common rotary axle are such that the respective central positions of the two permanent magnet poles coincide with each other at the same relative position of the rotor.

A phase-changing means may be constituted by switches by which connections between each terminal of stator windings of one of the two stators and a power source are switched to their opposite polarities or directions.

At the starting of the motor, the attracting action or the repelling action produced between the rotor formed by the first permanent magnet constituting the first rotor portion and the first rotating magnetic field generated by the stator facing the first rotor portion and the repelling action or the attracting action produced between the rotor formed by the second permanent magnet constituting a part of the second rotor portion and the second rotating magnetic field generated by the stator facing the second rotor portion respectively cancel each other on the common rotary axle. Thus, without being influenced by the permanent magnets, the motor starts as an ordinary induction motor by the magnetic induction action produced between the induction type rotor constituting the other part of the second rotor portion and the second rotating magnetic field.

After the starting of the motor, as the rotating speed of the rotor approaches a synchronous speed, the phase difference between the first rotating magnetic field and the second rotating magnetic field as applied at the starting operation is changed by 180 degrees in electrical angle. Then, there is produced an attracting action both between the rotor formed by the first permanent magnet constituting the first rotor portion and the first rotating magnetic field and between the rotor formed by the second permanent magnet constituting a part of the second rotor portion and the second rotating magnetic field, thereby bringing the motor into its synchronous operation. At this time, since the induction rotor constituting the other part of the second rotor portion is rotating at a synchronous speed, no magnetic induction action develops with respect to the second rotating magnetic field and hence there is no influence to the synchronous operation of the motor.

BRIEF DESCRIPTION OF THE DRAWINGS

The above and other objects, features and advantages of the present invention will be apparent from the following description of preferred embodiments of the invention, with reference to the accompanying drawings, in which.

PREFERRED EMBODIMENTS OF THE INVENTION

Now, preferred embodiments of the invention will be explained with reference to the accompanying drawings.

Throughout the following explanation, similar reference symbols or numerals refer to the same or similar elements in all figures of the drawings.

Figure 1:
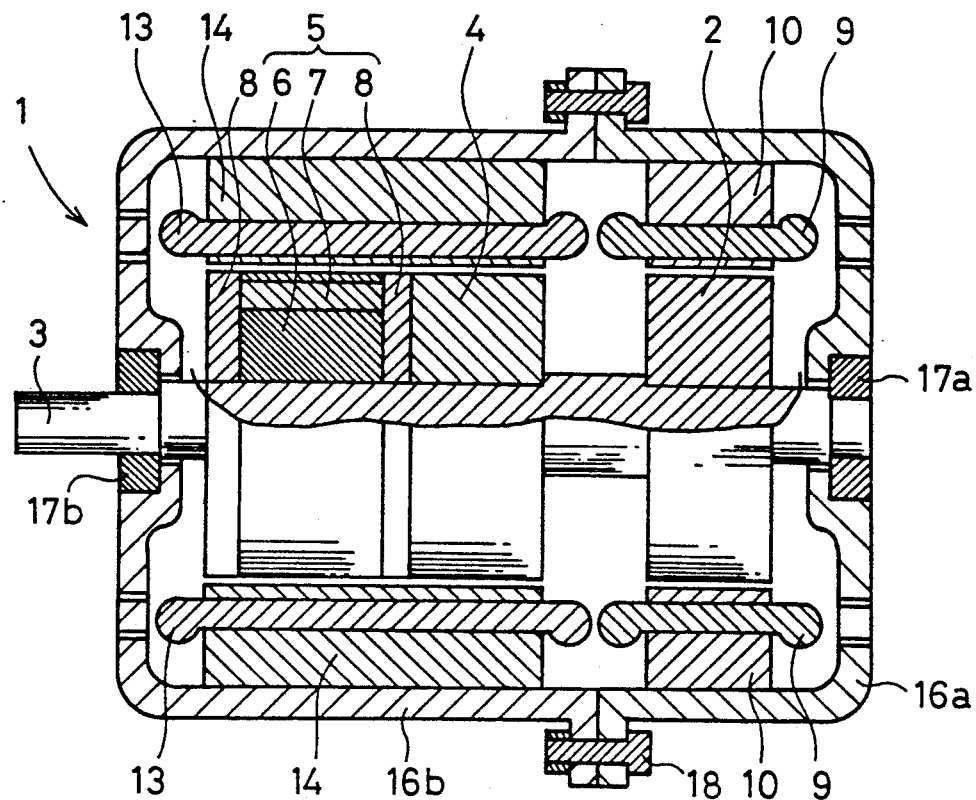
FIG. 1 is a side sectional view of the synchronous motor according to the present invention.
Figure 2:
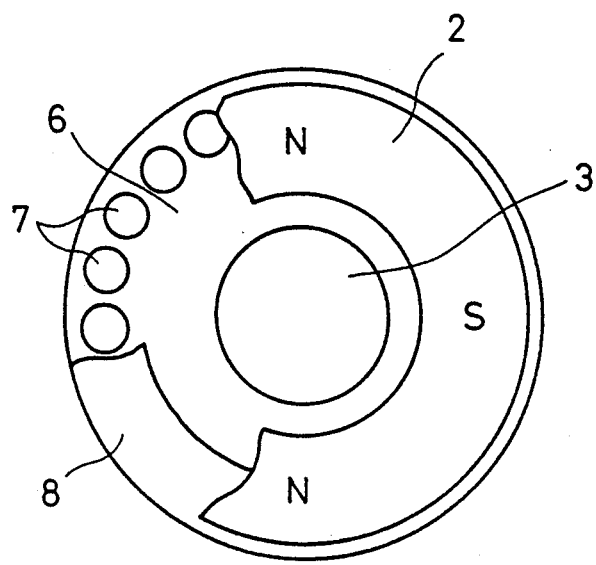
FIG. 2 is a side view, with a portion broken in section, of the rotor as seen at an axial center of the rotor.

FIG. 1 shows a side sectional view of a synchronous motor according to the invention and FIG. 2 shows a side sectional view of a rotor which is seen from the axial center of the rotor from the side of a squirrel cage rotor and which is shown in partially broken sections.

The rotor has a first rotor portion formed by a rotor 2 of a permanent magnet and a second rotor portion formed by a rotor 4 of a permanent magnet and a squirrel cage type rotor 5, all of which are unitarily mounted on a rotary axle with a space being provided between the permanent magnet rotor 2 and the permanent magnet rotor 4. The number of poles of the rotor 2 formed by the permanent magnet and that of the rotor 4 also formed by the permanent magnet is the same. In this embodiment, the centers of the magnetic poles of respective permanent magnets coincide with each other at their relative positions but this coinciding arrangement is not limitative. The squirrel cage type rotor 5 constituting a part of the second rotor portion is formed by an arrangement wherein a plurality of rotor conductors 7 are provided on the outer periphery of a rotor core 6 formed by laminated steel members and both the ends of the rotor conductors 7 are respectively short-circuited by short-circuit rings 8. It is also possible to use a wound-type rotor instead of the squirrel cage type rotor 5. The unitary rotor formed in the manner as explained herein is rotatably carried by bearings 17a, 17b provided in frames 16a, 16b. These frames 16a, 16b are fixed together by bolt and nut members 18.

For the first rotor portion and the second rotor portion of the above explained unitary rotor, there are respectively provided separate stators, that is, each of the two stators is provided so as to face each of the two rotor portions. The stator 10 having stator windings 9 is provided on the inner peripheral wall of the frame 16a for the permanent magnet rotor 2 constituting the first rotor portion. Also, the stator 14 having stator windings 13 is provided on the inner peripheral wall of the frame 16b for the second rotor portion. As seen from the drawings, the stator 14 acts magnetically both with the permanent magnet rotor 4 and the squirrel cage type rotor 5 which constitute the second rotor portion.

It is to be noted that there are arrangements which may be appropriately adopted or selected according to the capacity or use of the motor, such arrangements including the provision of cooling fans to the frames, the provision of cooling effect by means of fins to the short-circuit ring 8, the making of changes in the shapes of the frames 16a, 16b and the provision of cooling air passages in the frames 16a, 16b, the stators 10, 14 and the rotor.

Figure 3:
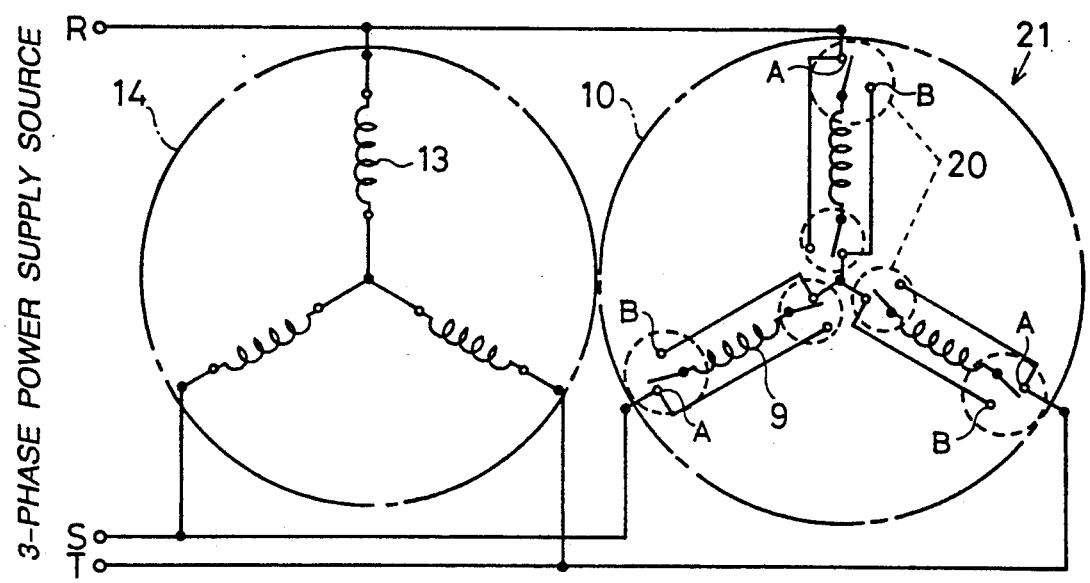
FIG. 3 is a diagram showing wiring connections between the stator windings and the phase-changing means of the synchronous motor.

FIG. 3 shows an example of wire connections between the stator windings 9 and the stator windings 13 and also wire connections to three-phase power sources R, S and T. In the example shown in the drawings, the stator windings 9, 13 are connected in parallel to the three-phase power sources but they can be connected in series. To either one of the stator windings 9 and the stator windings 13, that is, to the stator windings 9 of the stator 10 in the example shown in the drawings, the stator windings 9 of the stator 10 are provided with the phase-changing means 21 by which the phase of the rotating magnetic field produced by that stator 10 around the first rotor portion is phase-shifted by 180 degrees through the simultaneous switching of switches 20. This phase-changing means 21 also functions such that the phase difference of 0 degree or 180 degrees may selectively be produced between the rotating magnetic field produced around the first rotor portion by the one stator 10 to which the phase-changing means is provided and the rotating magnetic field produced around the second rotor portion by the other stator 14. In FIG. 3, the phase-changing means 21 is so arranged that the phase difference becomes 0 degree when the contact point of each of the switches 20 is at A-side and becomes 180 degrees when the same is at B-side.

In the synchronous motor according to the present invention, whether the starting of the motor is to be effected at the phase difference of 0 degree with the contact point of each switch 20 of the phase-changing means 21 being at A-side and subsequently switched to the phase difference of 180 degree with the contact point at B-side or, on the contrary, the starting of the motor is to be effected at the phase difference of 180 degrees and subsequently switched to 0 degree with the contact point at A-side, depends on whether the center of the magnetic pole of the permanent magnet 2 constituting the first rotor portion and the center of the magnetic pole of the permanent magnet 4 constituting a part of the second rotor portion coincide with each other in opposite polarities or coincide with each other in the same polarity in their relative positions.

Figure 4A:
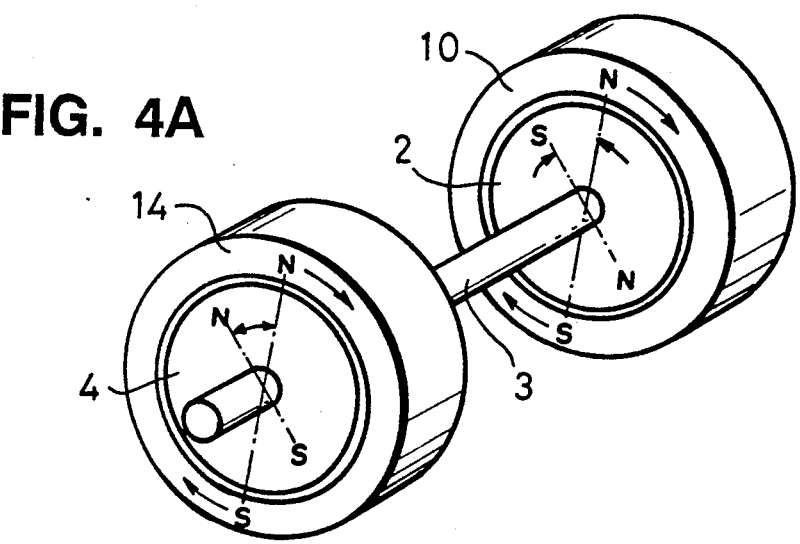
FIG. 4A is a diagram showing a state of the stators and the permanent magnet rotor portions at the starting of the synchronous motor of a first embodiment according to the invention.

FIG. 4A shows that the centers of the magnetic poles of the permanent magnets 2, 4 coincide with each other in the opposite polarities. In this case, the starting of the motor is effected at the phase difference of 0 degree with the contact point of each switch of the phase-changing means 21 being at A-side and subsequently, as the rotation speed accelerates and the slip approaches 0 (zero), the contact point is switched to B-side for 180 degrees whereupon the motor operates at the synchronous speed. With an example of the rotor in which the centers of the magnetic poles of the permanent magnets 2, 4 coincide with each other in the opposite polarities, explanation is made hereinafter on the operation relating to the switching from the starting operation to the synchronous operation.

At the starting of the motor, the phase difference between the rotating magnetic field produced by the stator 10 and the rotating magnetic field produced by the stator 4 is 0 degree, so that the magnetic polarities of the two stators at the same relative position always become the same polarity (e.g., N-pole and N-pole or S-pole and S-pole). Therefore, as shown in FIG. 4A, assuming that, at the starting of the motor, the rotating magnetic field of the one stator 10 and the permanent magnet 2 faced by the stator 10 are in their attracting state at N-pole and S-pole, the rotating magnetic field of the other stator 14 and the permanent magnet 4 faced by this stator 14 are in the repelling state at N-pole and N-pole. This is due to the arrangement wherein the two permanent magnets 2, 4 coincide with each other in the opposite polarities in their relative positions, that is, the S-pole and the N-pole of the permanent magnet 2 and the N-pole and the S-pole of the permanent magnet 4 are respectively opposing to each other. The attracting action (or repelling action) produced between the stator 10 and the permanent magnet 2 on one side and the repelling action (or attracting action) produced between the stator 14 and the permanent magnet 4 on the other side take place on the same rotary axle 3 and, as a result, these two actions cancel each other. Consequently, in the synchronous motor according to the present invention, the starting operation is unaffected by the permanent magnets 2, 4 and the motor operates as an induction motor by the magnetic induction action produced between the rotating magnetic field of the stator 14 and the squirrel cage type rotor 5. In the synchronous motor according to the invention, since the permanent magnets 2, 4 do not have any influence to the starting action of the squirrel cage type rotor 5, there is no need to take into account any starting interference and this allows the squirrel cage type rotor to be small in size unlike in the prior art arrangement.

Next, as the rotation speed of the rotary axle 3 increases by the magnetic induction action of the stator 14 and the squirrel type rotor 5 and at the point when the slip S has approached S=0.05, the operation enters into a synchronous operation. How this takes place is now explained.

Figure 4B:
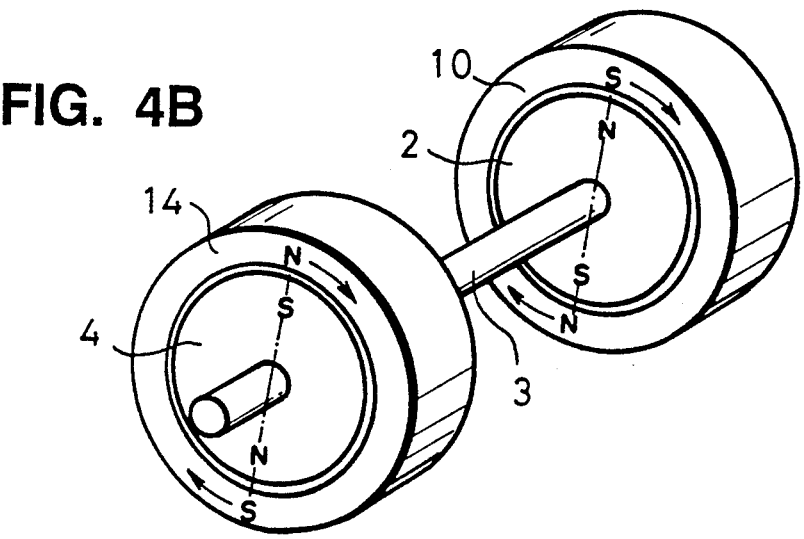
FIG. 4B is a diagram showing a state of the magnetic poles when the synchronous motor according to the first embodiment starts operating at a synchronous speed.

By having the switches 20 of the phase-changing means 21 switched to B-side, the phase difference between the rotating magnetic field produced by the stator 10 and the rotating magnetic field produced by the stator 14 is made 180 degrees. As shown in FIG. 4B, since the phase difference of the rotating magnetic fields produced by the stators 10, 14 becomes 180 degrees, the momentary polarities of the two stators 10 and 12 at the same relative position are always opposite to each other, that is, they are S-pole and N-pole. Thus, the respective N-pole and S-pole of the permanent magnet rotors 2 and 4 and the rotating magnetic fields attract each other thereby allowing the permanent magnet rotors 2 and 4 to enter into the synchronous operation. In this state, since the squirrel cage type rotor 5 is rotating at the same speed as the rotating magnetic field produced by the stator 14, no magnetic induction action exists between them and the synchronous operation is not affected thereby.

Figure 4C:
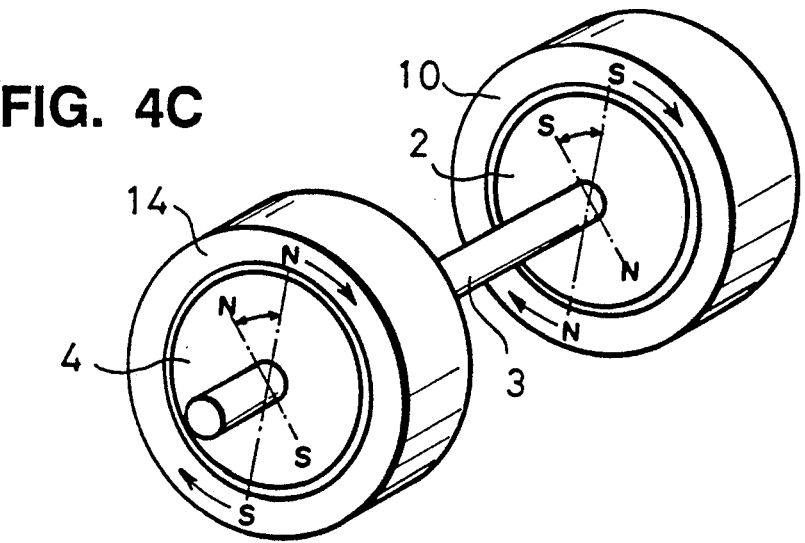
FIG. 4C is a diagram showing a state in which the synchronous motor is in a transient state of being brought into its synchronous operation.

It is best when the relations between the magnetic poles of the rotating magnetic fields and those of the permanent magnet rotors at the moment of the entry into the synchronous operation are both in the attracting state as shown in FIG. 4B, but even if such relations are as shown in FIG. 4C wherein the magnetic poles of the stators 10, 14 and those of the permanent magnet rotors 2, 4 are in the state in which both the magnetic poles are of the same polarities and in a nearly approached state, the S-pole of the permanent magnet rotor 2 and the S-pole of the stator 14 repel each other and likewise the N-pole of the permanent magnet rotor 4 and the N-pole of the stator 14 repel each other. However, the positions of the permanent magnet rotors 2, 4 become immediately a state as shown in FIG. 4B so that, finally, all of the N-poles and S-poles are stably in an attracted state thereby allowing the motor to enter into a synchronous speed operation.

In the synchronous motor according to the invention, at the starting of the motor, any starting interference which may otherwise be caused by the presence of the permanent magnet rotors is made negligible so that the squirrel cage type rotor may be designed with only the starting torque taken into account. Thus, the squirrel cage type rotor can be made small in size as compared with that in the prior art arrangement. Also, since there is no need to take into account any such starting interference as present in the prior art arrangement, it is possible for the permanent magnet rotors to be designed proportional to the required synchronous torque whereby the synchronous torque can be increased.

The synchronous motor according to the present invention is started by the induction motor, so that it is possible to utilize a power source which is used in an ordinary induction motor. That is, the power source may be an AC power source of a commercial frequency or a variable frequency power supply utilizing an inverter. The phase may either be a single phase or multiple phases.

Figure 5:
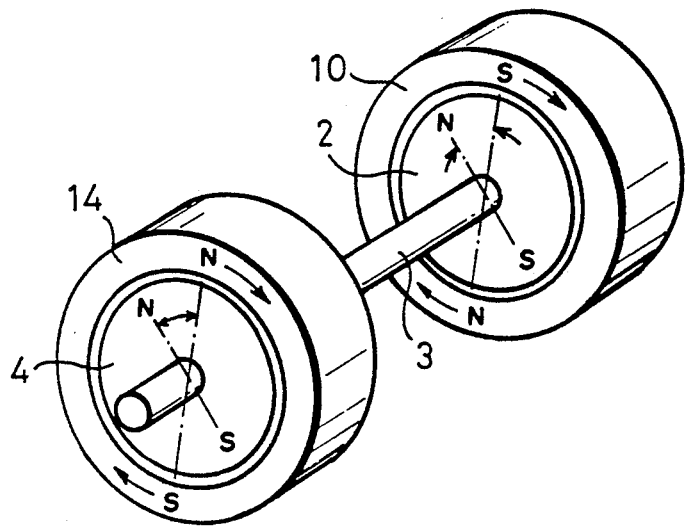
FIG. 5 is a diagram showing a state of the stators and the permanent magnet rotor portions at the starting of the synchronous motor of a second embodiment according to the invention.

The forgoing explanation has been directed to an embodiment wherein, with the phase-changing means 20 effecting the electrical phase differences of 0 degree and 180 degrees in the rotating fields of the two stators, the motor is started at the phase difference of 0 degree and is brought into a synchronous operation at the phase difference of 180 degrees. However, it is also possible to start the motor at the phase difference of 180 degrees and to bring it to the synchronous operation at the phase difference of 0 degree. In this case, as shown in FIG. 5, the magnetic poles of the permanent magnet rotors 2 and 4 at the same relative position may be disposed in such a way that the poles of the same polarity oppose to each other, that is, the N-pole and the S-pole of the permanent magnet 2 and the N-pole and the S-pole of the permanent magnet 6 respectively oppose to each other. The principles of the starting of the motor and of the bringing of the operation into a synchronous operation and the operational characteristics obtained in this embodiment are the same as those already explained with reference to FIGS. 4A–4C.

The phase-changing means 21 has been explained as being constituted by the switches 20 but it is possible for this to be a rotatable stator type wherein one of the two stators is allowed to be rotatably displaced with respect to the other of the two stators.

As explained above, in the synchronous motor according to the present invention, the motor starts in the same principle as in the conventional induction motor and, when the slip S approaches, for example, S=0.05, the speed changes to a synchronous speed and the motor operates with the torque characteristics of the synchronous motor. The motor does not require a starter or brushes thereby allowing the configuration of the motor to be simpler. Also, since the motor can start with the same torque characteristics as in the conventional induction motor, it is possible for the motor to start even under a loaded condition and continue on to the synchronous operation.

Since any starting interference from the two permanent magnets is made negligible due to the cancellation action, the squirrel cage type rotor may be designed with only the starting torque taken into account. The permanent magnets which do not cause the starting interference to occur allow the designing of the permanent magnet rotors to be proportional to the required synchronous torque. This means in effect that the synchronous motor thus realized is one which can be small in its size but which can produce a large torque.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A synchronous motor comprising:
   a unitary rotor which has a first rotor portion with a first polarity formed by a first permanent magnet and a second rotor portion with a second polarity formed by a second permanent magnet and an induction type rotor, said first rotor portion and said second rotor portion being mounted on a common rotary axle with a predetermined space being provided therebetween;
   a first stator which surroundingly faces said first rotor portion for producing a first rotating magnetic field around said first rotor portion;
   a second stator which surroundingly faces said second rotor portion for producing a second rotating magnetic field around said second rotor portion, said second stator being disposed so that, at the starting operation, the attracting action or the repelling action produced between said first rotating magnetic field and said first permanent magnet is canceled by the repelling action or the attracting action produced between said second rotating magnetic field and said second permanent magnetic; and
   a phase-changing means which is associated with either one of said first and second stators and which sets a phase difference between said first rotating magnetic field produced by said first stator and said second rotating magnetic field produced by said second stator at a first phase difference for starting operation and at a second phase difference for synchronous operation, said phase difference being different from said first phase difference by 180 degrees.

2. A synchronous motor according to claim 1, in which said phase-changing means is adapted to be set to 180 degrees for said first phase difference for the starting operation and to 0 degree for said second phase difference for the synchronous operation.

3. A synchronous motor according to claim 2, in which said first and second permanent magnets are mounted on said common rotary axle and aligned so that the first polarity of said first permanent magnet has the same polarity as the second polarity of said second permanent magnet in their relative positions.

4. A synchronous motor according to claim 1, in which said phase-changing means is adapted to set said first phase difference to 0 degree for the starting operation and said second phase difference to 180 degrees for the synchronous operation.

5. A synchronous motor according to claim 4, in which said first and second permanent magnets are mounted on said common rotary axle with and aligned so that the first polarity of said first permanent magnet has a polarity opposite to the second polarity of said second permanent magnet in their relative positions.

6. A synchronous motor according to claim 4, in which said phase-changing means is constituted by switch means by which connections between a power source and each terminal of stator windings of either one of said first stator and said second stator are switched to their opposite polarities.

7. A synchronous motor according to claim 1, in which said induction type rotor is a squirrel cage type rotor.

* * * * *

UNITED STATES PATENT AND TRADEMARK OFFICE
CERTIFICATE OF CORRECTION

PATENT NO. : 5,281,879

DATED : January 25, 1994

INVENTOR(S) : Toshihiko SATAKE and Yukio ONOGI

It is certified that error appears in the above-identified patent and that said Letters Patent is hereby corrected as shown below:

Column 5, line 23, delete "4" and insert --14--.

Signed and Sealed this

Fifteenth Day of November, 1994

Attest:

BRUCE LEHMAN

*Attesting Officer*  *Commissioner of Patents and Trademarks*